Jan. 8, 1957 W. R. HEDEMAN, JR., ET AL 2,777,122
RADAR SCANNING SYSTEM
Filed Oct. 4, 1950 3 Sheets-Sheet 1

WALTER R. HEDEMAN, JR.
EDWARD L. CROSBY, JR.
INVENTOR.

BY Killman and Kerst

Jan. 8, 1957 W. R. HEDEMAN, JR., ET AL 2,777,122
RADAR SCANNING SYSTEM
Filed Oct. 4, 1950 3 Sheets-Sheet 2

WALTER R. HEDEMAN, JR.
EDWARD L. CROSBY, JR.
*INVENTOR.*

BY *Killman and Kerst*

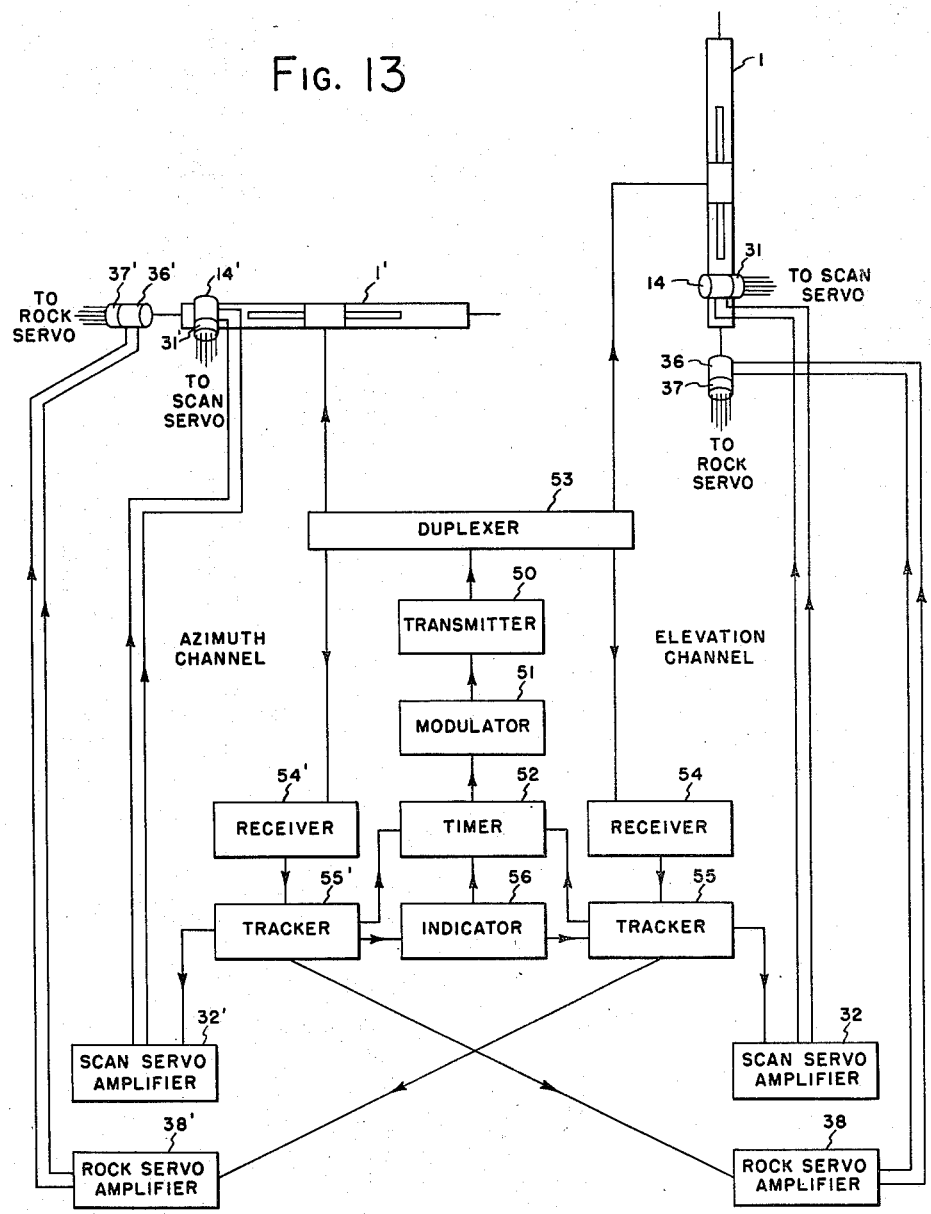

United States Patent Office 2,777,122
Patented Jan. 8, 1957

2,777,122

RADAR SCANNING SYSTEM

Walter R. Hedeman, Jr., and Edward L. Crosby, Jr., Baltimore, Md., assignors to Bendix Aviation Corporation, Towson, Md., a corporation of Delaware Application October 4, 1950, Serial No. 188,388

4 Claims. (Cl. 343—100)

This invention relates to systems for forming the radiated energy of radio echo devices into beams and causing the beams to repetitively scan a region of space. It relates more particularly to a system utilizing one or more antennas of elongated slender configuration to scan a volume of space having a cross-sectional area of substantial extent in both dimensions.

In prior arrangements such volumes have been scanned by antennas which of themselves extended substantially in two directions, presenting a surface of considerable area. This is particularly true of antennas used for search purposes. In this type of use it is necessary to concentrate the energy into a beam of small cross-sectional area in order to achieve maximum sensitivity. The beam is repetitively swept in any of a number of patterns which completely cover a volume of space of much greater cross-sectional area than that of the beam.

Heretofore, antennas for search purposes have for the most part been of the type utilizing paraboloid reflectors. For a given carrier frequency the area of the reflector used must increase as the cross-sectional area of the beam is decreased. To secure a beam of acceptable concentration for search purposes the reflector area must be considerable except at very high frequencies. This, of necessity, has restricted airborne search units to such frequencies.

There has been in existence a type of elongated slender antenna array known as the "Eagle" scanner. It utilizes a line of small dipoles mounted in one face of a waveguide. The dipoles are so phased as to produce a fan of energy of narrow cross-section, the long dimension of the fan being at right angles to the longitudinal axis of the waveguide. The beam is made to scan in directions parallel to the longitudinal axis of the waveguide by varying the width of the latter.

As previously employed, these antennas have been made to scan only in this manner. The only movement of the antenna about its longitudinal axis has been for the purpose of positioning the beam at a desired location.

It is an object of the invention to produce a scan having a cross-sectional area large in two dimensions, by the use of one or more elongated slender antenna arrays;

It is a further object of the invention to utilize one or more antenna arrays of the "Eagle" type to provide such a scan;

It is another object of the invention to utilize an arrangement of antenna arrays which may be contained within the normal aerodynamically dictated structure of an aircraft to provide a scan of high sensitivity having a cross-sectional area large in both dimensions;

It is yet another object of the invention to provide an antenna array which may be electrically controlled in scan and which may be caused to scan through a wide range of patterns without altering its physical condition; and, It is a still further object of the invention to provide an antenna arrangement which may be utilized, either to scan through a repetitive pattern in a fixed attitude for search purposes, or to respond to error voltages to shift the axis of scan for tracking purposes.

The above and other objects and advantages of the invention are realized by an arrangement in which an antenna of the "Eagle" type is mounted for rocking movement about the longitudinal axis of the waveguide. The rocking movement is electrically synchronized with the scanning movement of the beam to produce a conical scan, the shape of the section of the cone depending upon the beamwidth. By mounting two "Eagle" type antennas, with the longitudinal axes of their waveguides extending at right angles, the rocking movements of the two antennas may be synchronized to maintain the beams with a region of overlap or common illumination. The overlapped beams may be caused to scan as one beam, causing the region of overlap to trace a repetitive scanning pattern as desired. After a target has been located the overlapped beams may be caused to generate a cone of illumination responding to error voltage in a null seeking manner to center the cone on the target.

Referring now to the drawing:

Fig. 13 is a schematic block diagram of the electrical circuits involved in an arrangement embodying the invention.

Figure 1:
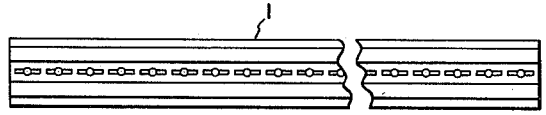
Fig. 1 is a plan view of an antenna array of the "Eagle" type.
Figure 2:
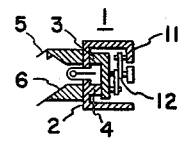
Fig. 2 is an end view in cross-section of the antenna of Fig. 1.
Figure 3:
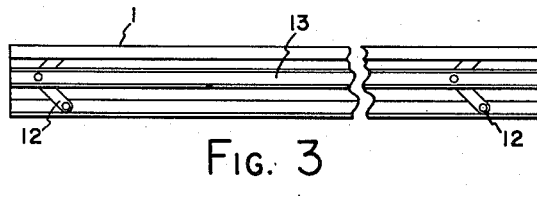
Fig. 3 is a plan view of the antenna of Fig. 1 as seen from the rear.

Figs. 1, 2, and 3 show various aspects of an antenna array 1 of the "Eagle" type. The array is built around a waveguide formed of a fixed plate 2 and a movable plate 3. The movable plate 3 is of L shape in cross-section and the fixed plate 2 has an extension 4 which causes a portion of it to also have an L shape in cross-section. These two L shapes are fitted together to enclose a space having a rectangular cross-section.

Mounted in a row along the center of the major side of the waveguide formed by the fixed plate 2 are a plurality of dipoles, each coupled to the waveguide by a probe. The dipoles are so spaced that, at the maximum width of the waveguide, the phasing of their radiations is such that a fan-shaped beam of radiation is emitted having the shape shown in Fig. 5. At this condition of the waveguide the beam extends in a direction normal to the emitting surface of the waveguide. A pair of reflectors 5 and 6 extend outwardly from the waveguide to shape the beam by controlling its long cross-sectional dimension.

Figure 5:
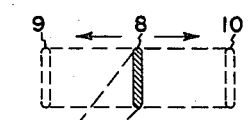
Fig. 5 is a diagrammatic representation of the antenna of Fig. 1 and its beam, showing the type of scan heretofore employed.

In the previous employment of antennas of this type the beam has been caused to scan in the manner shown in Fig. 5. The beam 7 having a cross-section 8 moves along a straight line path having the limits 9 and 10. This is accomplished by varying the width of the waveguide repetitively and altering the direction of feed in synchronism with this movement.

As shown in Figs. 2 and 3, the movable plate 3 is connected to a rearward extension 11 of the fixed plate 2 by means of toggle joints 12, which are connected to a bar 13. The latter is reciprocated by means of a motor 14, through a worm 15, and worm gear 16 carrying an eccentrically supported connecting rod 17. The variation in the lateral dimension of the waveguide caused by this mechanism changes the phase relationship of the energy emitted by the dipoles and causes the fan-shaped beam to shift its angular relationship with the axis of the waveguide.

Figure 4:
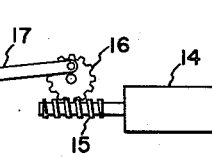
Fig. 4 is a diagrammatic representation of the antenna of Fig. 1, with its feeding arrangement.

When the waveguide is at its maximum dimension, the beam 7 extends at right angles to the axis of the waveguide. As the guide is narrowed, the beam moves angularly toward one end of the axis. As the guide is again widened the beam moves back to its original position at right angles to the axis. To produce an excursion towards the opposite end of the axis, the direction of feed must be reversed. This is accomplished by the means shown in Fig. 4, in which an R. F. switch 18 periodically reverses the feed through waveguides 19 and 20 going to opposite ends of the antenna. The residue not radiated is fed by the switch to an absorbing termination through line 21. A relay system actuated by the motor 14 causes reversal of the switch each time the waveguide reaches its maximum width. This system has not been shown since it is well known.

The system which has been described can be found more fully explained in Massachusetts Institute of Technology Radiation Laboratory Series, volume 26, Radar Scanners and Radomes, published by McGraw-Hill Book Company, Inc., at page 185 et. seq.

It can be seen from Fig. 5 that the scan available from the above system has a cross-section which is long and narrow and not suitable for either search or tracking. Its principal use in the past has been in connection with ground controlled approach systems in which aircraft are observed in a restricted volume of space over a runway and are guided verbally to a landing through fog, rain or snow. In such use two antennas were arranged, one with its longitudinal axis vertical and the other with its axis horizontal. The first scans in elevation and the second in azimuth, each being manually positioned to maintain the aircraft within its beam of illumination.

Figure 6:
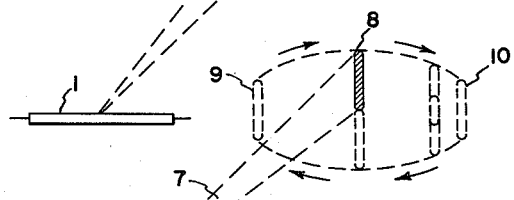
Fig. 6 is a diagrammatic representation of the antenna of Fig. 1 and its beam, showing a scan in accordance with the invention.

In accordance with the instant invention, the antenna array 1 is mounted on trunnions for pivotal movement about its longitudinal axis and means are provided for rotating it about this axis in synchronism with the scanning movement depicted in Fig. 5. With proper synchronism this will produce a scan having the shape of a cone, the cross-sectional form of which will depend considerably upon the shape of the beam which is employed. Figure 6 illustrates diagrammatically a form of scan which can be obtained in the practice of the invention. It will be seen that the scan pattern is twice as wide as that of Fig. 5.

Figure 7:
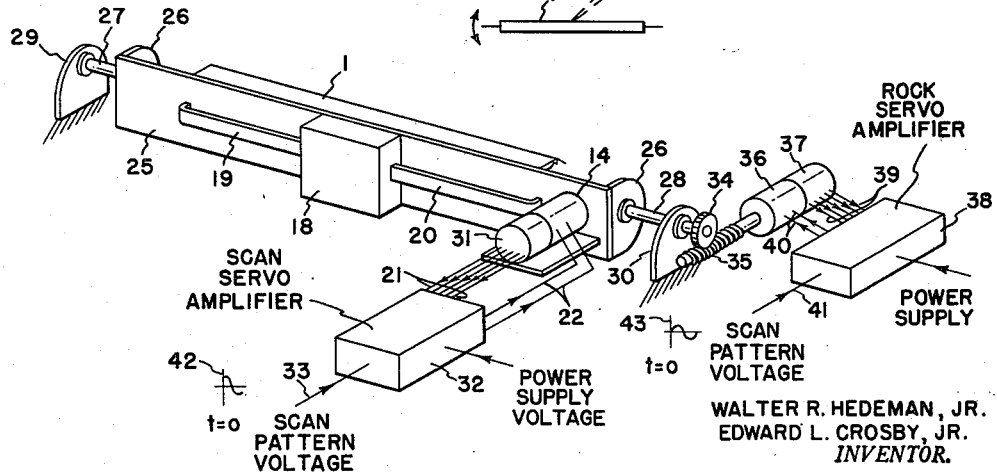
Fig. 7 is a perspective view of an antenna of the "Eagle" type fitted for both rocking and scanning in accordance with the invention.

Fig. 7 illustrates an embodiment of the invention. The antenna array 1 has been mounted upon a supporting member 25 provided with end pieces from which protrudes axles 27 and 28. The axles 27 and 28 are journalled in supporting members 29 and 30, which are fixedly mounted.

The R. F. switch 18 is illustrated as a box carried on the back of the supporting member 25. The waveguides 19 and 20 extend from the switch through the supporting member 25 to the ends of the antenna array 1. The motor 14, for reciprocating the rod 13, is shown as mounted on the back of the supporting member 25, where it is connected to a unit 31 of a self-synchronized system which unit may, for example, be of the type commercially designated as an Autosyn. The Autosyn 31 is connected by five leads 21 in a conventional manner to a servo amplifier 32 to which scan pattern voltage is applied from a lead 33. The servo amplifier is connected to the motor by leads 22.

The axle 28 extends through the supporting member 30 and terminates in a worm gear 34, which is driven by a worm 35. The worm 35 is driven by a motor 36 connected to an Autosyn 37. The Autosyn 37 is connected to a servo amplifier 38 in the customary manner by five leads 39 and the servo amplifier in turn is connected to the motor 36 by leads 40. Scan pattern voltage is applied to the servo amplifier 38 by lead 41.

In the operation of this system scan pattern voltages of sine waveform, having the necessary phase relationship to produce a desired scan pattern, are fed to the two servo amplifiers 32 and 38, respectively. The graphs 42 and 43 shown adjacent leads 33 and 41, respectively, illustrate scan pattern voltages having a quadrature phase relationship which may be applied to the two servo amplifiers to produce a pattern of the type illustrated in Fig. 6. The Autosyns supply follow-up signals to the servo amplifiers, while the motors respond to the difference between the instantaneous scan pattern voltages and follow-up voltages to produce the pattern indicated.

Figure 8:
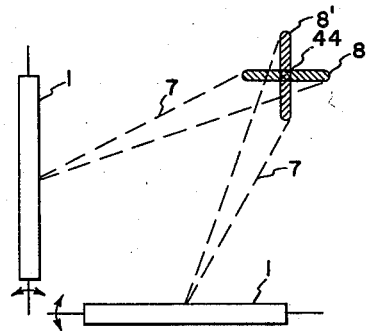
Fig. 8 is a diagrammatic representation of two "Eagle" type antennas arrayed in mutual perpendicularity and showing the beams of the two in overlapping arrangement.
Figure 9:
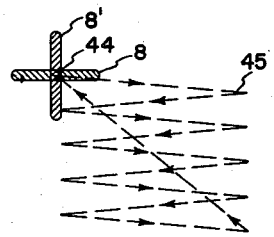
Fig. 9 is a diagrammatic representation of the beam pattern of Fig. 8 with an indication of one available scan pattern.
Figure 10:
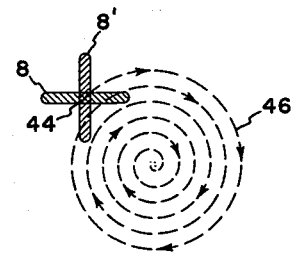
Fig. 10 is similar to Fig. 9, but shows a second available scan pattern.

The pattern of Fig. 6, while it is an improvement over that of Fig. 5 for certain purposes, may not be considered satisfactory for searching under certain conditions, since it is not sufficiently concentrated in both dimensions of its cross-sectional area to provide adequate sensitivity for rapid scanning operations. Such sensitivity can, however, be provided by the use of two antenna arrays 1 and 1' mounted as shown in Fig. 8, with their longitudinal axles mutually perpendicular. In such an arrangement the beams 7 and 7' may be made to have a region of overlap or common illumination. The region of overlap of the two beam patterns 8 and 8' is indicated as a square area 44. Within this area the concentration of illumination is sufficient to provide the required sensitivity for rapid scanning. By proper synchronism of the reciprocal scanning motions of the two antenna arrays and of their rotation about their longitudinal axes, the two beams 7 and 7' may be maintained in a locked relationship with the two cross-sectional beam patterns 8 and 8' being constantly maintained in the relative positions indicated at the desired range. By maintaining this beam relationship the area 44 may be caused to scan through any desired scanning pattern such, for example, as the conventional television type of scan or the conventional spiral scan which are both useful for search purposes. The television type of scan is illustrated in Fig. 9 with the dotted line trace 44 indicating the path of travel. It can be seen that such a path of travel will cause the area 44 to solidly cover a given volume of space having a rectangular cross-section. Fig. 10 illustrates a spiral scan path with the dotted line 46 indicating the path of travel of the area 44. By this means, the area 44 can be made to generate a cone-shaped beam having a circular cross-section as indicated.

The generation of the scans pictured in Figs. 8, 9, and 10 can be accomplished simply by applying, to the servo amplifiers 32 and 38 of each antenna array, scan pattern voltages which are properly phased and synchronized to cause the beams 1 and 1' to traverse the desired paths in space. The means for producing such voltages and the selection of phase relationships of two control voltages, to produce a desired travel of a resultant beam of energy, follow the same principles and techniques as utilized in the control of the electron beam of a cathode ray tube and for that reason they will not be described here in detail.

Figure 11:
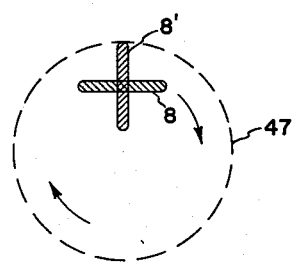
Fig. 11 is similar to Figs. 9 and 10, but shows a third type of scan pattern available for an antenna arrangement such as shown in Fig. 8.

While search requirements may dictate the use of such a concentrated area 44, the sensitivity requirements for tracking a target once it has been indicated, are not so severe. In such services the entire beam pattern 8, 8' may be utilized and follow up may be secured by rotating the crossed beams in a conical pattern generated by their entire cross-sectional areas. Such a scan pattern is indicated in Fig. 11 where the dotted line 47 indicates the boundaries of the cross-sectional area of the scan pattern. In the generation of such a pattern the scan pattern voltages fed to the servo amplifiers 32, 38 of each array are of the type illustrated by graphs 42 and 43. In this case, however, means must be provided to generate error voltages when any uneven illumination of the target occurs due to its movement away from the center of the scan pattern. These error voltages may be superimposed in the servo amplifiers upon the voltage supplied to produce the conical scan and the resultant output of the servo amplifiers moves the antenna arrays in directions tending to reduce the error voltage to zero. Once this has been accomplished, the scan continues solely under the influence of the scan pattern voltages.

A circuit for accomplishing these results is shown in block form in Fig. 13. In this figure the arrays 1 and 1' are shown as arranged with their longitudinal axes perpendicular as in Fig. 8. A radar system having a transmitter 50, a modulator 51, and a timer 52 is illustrated, the output of the transmitter being applied by way of a duplexer 53 to the two antennas 1 and 1'. The timer generates triggering signals which govern the excitation of the transmitter by the modulator. The duplexer, in accordance with known practice, applies the transmitter pulses simultaneously to the two antennas. Separate receivers 54 and 54' are provided for the energy reflected back to the respective antennas. The receivers are maintained in an inactive state by the duplexer, while the transmitter pulses are being emitted.

A pair of trackers 55 and 55' are supplied for the two channels. The output of tracker 55 is applied to scan servo amplifier 32 and to rock servo amplifier 38' while that of tracker 55' is applied to the remaining servo amplifiers. Each tracker includes a pair of oscillators which, for the purpose of search scanning, generate the necessary voltage for the respective servo amplifiers to which its output is fed. Each tracker receives the output of the receiver of its channel.

Once a target has been acquired and it is desired to track it, the sine waves necessary to produce the conical scan of Fig. 11 are generated by the trackers and applied to the servo amplifiers. The received echoes from the target will not disturb the output of the tracker, so long as the target is centered in the scan. If it leaves the center of the scan, however, a sine wave of receiver response is generated. The direction of its excursion from the center will be indicated by the phase of the sine wave with respect to the scan sine waves. The magnitude of the excursion will be reflected in the amplitude of the receiver response sine wave. Means are provided in each tracker for comparing the phase of the receiver response sine wave with that of the generated sine waves and deriving from these comparisons D. C. voltages which are superimposed upon the outputs of the trackers to cause the antenna arrays to be driven until the target is centered in the scan. The Autosyns at the antenna motors provide follow up signals as before, which signals are compared in the servo amplifiers with the tracker outputs.

The trackers also supply voltages to the sweep circuits of an indicator 56 of the cathode ray type to generate a display preferably of the C type. The raster is normally invisible, with the point of impact of the electron beam tracing a path in azimuth and elevation representative of the center of the scan. The trackers are also connected to the timer whereby they trigger the timer upon the receipt of each echo to unblank the indicator momentarily to produce a spot of light on the screen representative of the position of the center of the scan at that instant.

The details of the components of the system shown in block form in the circuit Fig. 13 have not been set forth since they are known to the art.

Figure 12:
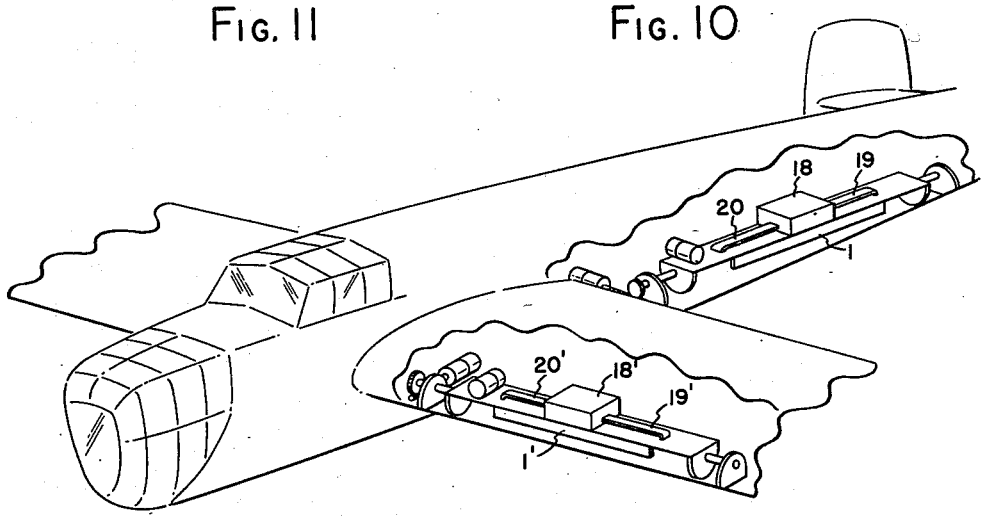
Fig. 12 is a perspective view of an aircraft with a pair of "Eagle" type antennas installed for operation in accordance with the invention.

Fig. 12 shows the manner in which an arrangement such as that of Fig. 8 lends itself to incorporation within the existing wing and fuselage structure of an aircraft. It can be seen that no protruding portions whatsoever are required. The invention thus renders available for use in aircraft for the first time, over a wide range of frequencies, a concentrated beam of energy available for scanning in customary search and track patterns with no addition whatsoever to the drag of the aircraft. Sensitivity normally associated only with antennas requiring large reflector areas is accomplished with antennas presenting only a small part of such areas. Furthermore, the same array renders available, without physical change, a beam either of highly concentrated energy of small cross-section for search use, or a beam of much larger cross-section for tracking use.

What is claimed is:

1. A scanning system comprising a pair of long narrow radiating devices extending at right angles to each other, each of said devices comprising a row of radiating elements, said row extending in substantial parallelism with the longitudinal axis of said device, and means feeding radio frequency energy to said elements, whereby the energy emitted from each of said devices is formed into a fan-shaped beam, having its longer cross-sectional dimension extending at right angles to the long dimension of said radiating device; means associated with each of said devices for cyclically varying the relative phase of the energy fed to the elements thereof whereby the beam of said device reciprocably moves in directions paralleling the long dimension of the said device; means reciprocably rotating each of said radiating devices about an axis parallel to its long dimension; first driving means individual to each of said radiating devices driving the phase varying means associated therewith, second driving means individual to said radiating devices driving the rotating means associated therewith, a first energy generating means generating cyclically varying energy, means applying energy from said generating means to the said first driving means of one of said devices and to the said second driving means of the other of said devices to actuate the same in accordance therewith, a second energy generating means generating cyclically varying energy, means applying energy from said second generating means to the remaining driving means associated with said devices to actuate the same in accordance therewith and means synchronizing the cyclically varying energy generated by said generating devices in a manner to maintain the beams of said devices in overlapping relations.

2. A scanning system comprising a pair of long narrow radiating devices extending at right angles to each other, each of said devices comprising a row of radiating elements, said row extending in substantial parallelism with the longitudinal axis of said device, and means feeding radio frequency energy to said elements, whereby the energy emitted from each of said devices is formed into a fan-shaped beam, having its longer cross-sectional dimension extending at right angles to the long dimension of said radiating device; means associated with each of said devices for cyclically varying the relative phase of the energy fed to the elements thereof whereby the beam of said device reciprocably moves in directions paralleling the long dimension of the said device; means reciprocably rotating each of said radiating devices about an axis parallel to its long dimension; a separate motor driving the phase varying means associated with each of said radiating devices; a separate motor driving the rotating means for each of said radiating devices; a first control voltage generating means generating and applying a control voltage having a waveform of repetitive configuration to the motor driving the phase varying means of one of said radiating devices and to the motor driving the rotating means of the other of said radiating devices; a second control voltage generating means generating and applying a control voltage having a waveform of repetitive configuration to the remaining motors; and means synchronizing the said control voltage generating means so that the repetitive configurations, frequencies and relative phases of the waveforms of said control voltages are such as to direct the beams from said radiating devices to an overlapping relationship and to cause the overlapped portion of said beams to generate a solidly scanned volume of space.

3. A scanning system comprising a pair of long narrow radiating devices extending at right angles to each other, each of said devices comprising a row of radiating elements, said row extending in substantial parallelism with the longitudinal axis of said device, and means feeding radio frequency energy to said elements, whereby the energy emitted from each of said devices is formed into a fan-shaped beam, having its longer cross-sectional dimension extending at right angles to the long dimension of said radiating device; means associated with each of said devices for cyclically varying the relative phase of the energy fed to the elements thereof whereby the beam of said device reciprocably moves in directions paralleling the long dimension of the said device; means reciprocably rotating each of said radiating devices about an axis parallel to its long dimension; a separate motor driving the phase varying means associated with each of said radiating devices; a separate motor driving the rotating means for each of said radiating devices; a first control voltage generating means generating and applying a control voltage of sine waveform to the motor driving the phase varying means of one of said radiating devices and to the motor driving the rotating means of the other of said radiating devices; a second control voltage generating means generating and applying a control voltage of sine waveform to the remaining motors; and means synchronizing the said control voltage generating means so that the magnitudes and relative phases of said control voltages are such as to direct the beams from said radiating devices to an overlapping relationship and to cause the overlapped portion of said beams to generate a solidly scanned volume of space.

4. A scanning system comprising a pair of long narrow radiating devices extending at right angles to each other, each of said devices comprising a row of radiating elements, said row extending in substantial parallelism with the longitudinal axis of said device, and means feeding radio frequency energy to said elements, whereby the energy emitted from each of said devices is formed into a fan-shaped beam, having its longer cross-sectional dimension extending at right angles to the long dimension of said radiating device; means associated with each of said devices for cyclically varying the relative phase of the energy fed to the elements thereof whereby the beam of said device reciprocably moves in directions paralleling the long dimension of the said device; means reciprocably rotating each of said radiating devices about an axis parallel to its long dimension; a separate motor driving the phase varying means associated with each of said radiating devices; a separate motor driving the rotating means for each of said radiating devices; a first control voltage generating means generating and applying a control voltage of repetitive waveform to the motor driving the phase varying means of one of said radiating devices and to the motor driving the rotating means of the other of said radiating devices; a second control voltage generating means generating and applying a control voltage of repetitive waveform to the remaining motors; and means synchronizing the said control voltage generating means so that the magnitudes and relative phases of said control voltages are such as to direct the beams from the radiating devices to an overlapping relationship and to maintain said relationship throughout said traversing and rotating movements.

References Cited in the file of this patent

UNITED STATES PATENTS

| | | |
|---|---|---|
| 2,409,462 | Zworykin | Oct. 15, 1946 |
| 2,415,094 | Hansen | Feb. 4, 1947 |
| 2,427,029 | Stearns | Sept. 9, 1947 |
| 2,434,253 | Beck | Jan. 13, 1948 |
| 2,468,751 | Hansen | May 3, 1948 |
| 2,480,189 | Irving | Aug. 30, 1949 |
| 2,480,208 | Alvarez | Aug. 30, 1949 |
| 2,493,774 | Moore | Jan. 10, 1950 |
| 2,514,617 | Albersheim | July 11, 1950 |
| 2,518,564 | Nebel | Aug. 15, 1950 |
| 2,524,292 | Iams et al. | Oct. 3, 1950 |
| 2,555,101 | Alvarez | May 29, 1951 |
| 2,585,855 | Sherwin et al. | Feb. 12, 1952 |
| 2,605,413 | Alvarez | July 29, 1952 |
| 2,660,722 | Ley et al. | Nov. 24, 1953 |